United States Patent
Aoki

(10) Patent No.: US 11,747,628 B2
(45) Date of Patent: Sep. 5, 2023

(54) AR GLASSES

(71) Applicant: TOYOTA JIDOSHA KABUSHIKI KAISHA, Aichi-ken (JP)

(72) Inventor: Takayuki Aoki, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/972,591

(22) Filed: Oct. 25, 2022

(65) Prior Publication Data

US 2023/0204961 A1 Jun. 29, 2023

(30) Foreign Application Priority Data

Dec. 13, 2021 (JP) ................. 2021-201988

(51) Int. Cl.
G09G 3/36 (2006.01)
G09G 3/00 (2006.01)
G02B 27/01 (2006.01)

(52) U.S. Cl.
CPC ......... *G02B 27/0172* (2013.01); *G09G 3/001* (2013.01); *G09G 3/3611* (2013.01); *G02B 2027/0118* (2013.01); *G02B 2027/0178* (2013.01); *G09G 2354/00* (2013.01); *G09G 2380/10* (2013.01)

(58) Field of Classification Search
CPC ........ G02B 27/0172; G02B 2027/0118; G02B 2027/0178; G09G 3/001; G09G 3/3611; G09G 2354/00; G09G 2380/10
See application file for complete search history.

(56) References Cited

U.S. PATENT DOCUMENTS

| 2019/0064526 | A1* | 2/2019 | Connor | G02B 6/0073 |
| 2020/0105224 | A1* | 4/2020 | Higashiyama | G02B 27/0101 |
| 2020/0142200 | A1  | 5/2020 | Sato et al. | |
| 2021/0003848 | A1* | 1/2021 | Choi | G06V 40/19 |
| 2022/0197377 | A1* | 6/2022 | Kim | G09G 3/2092 |

FOREIGN PATENT DOCUMENTS

| CN | 106842570 | A | * | 6/2017 | | |
| CN | 110349526 | A | * | 10/2019 | | |
| CN | 212135067 | U | * | 12/2020 | | |
| CN | 112255800 | A | * | 1/2021 | ......... | G02B 27/0172 |
| CN | 112305765 | A | * | 2/2021 | ........... | G02B 26/005 |
| CN | 112950791 | A | * | 6/2021 | ............. | G06N 20/00 |
| CN | 114415372 | A | * | 4/2022 | | |
| CN | 115586643 | A | * | 1/2023 | | |
| JP | 2003237412 | A | * | 8/2003 | | |
| JP | 2012088472 | A | * | 5/2012 | | |
| JP | 2013187794 | A | * | 9/2013 | | |
| JP | 2014186089 | A | * | 10/2014 | ......... | G02B 27/0093 |
| JP | 2019184758 | A |   | 10/2019 | | |
| WO | WO-2018015496 | A1 | * | 1/2018 | ......... | G02B 27/0103 |
| WO | 2019004336 | A1 |   | 1/2019 | | |
| WO | WO-2020241189 | A1 | * | 12/2020 | ......... | G02B 27/0093 |

* cited by examiner

*Primary Examiner* — Ricardo Osorio

(74) *Attorney, Agent, or Firm* — HAUPTMAN HAM, LLP

(57) ABSTRACT

AR glasses include: a display unit that displays a virtual image within a field of view of a wearer such that an actual view right in front of the wearer is able to be seen; and a liquid crystal panel that is able to partially change a transmittance of external light. An AR glasses control unit sets a transmittance of external light of a portion of the liquid crystal panel corresponding to the virtual image to be lower than a transmittance of external light of another portion.

9 Claims, 7 Drawing Sheets

FIG. 3
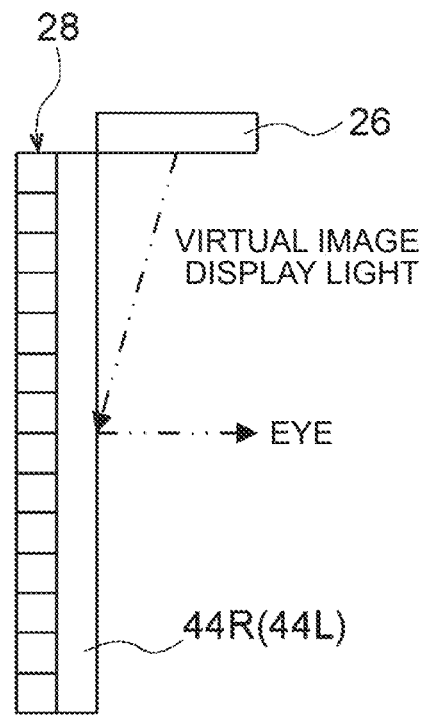
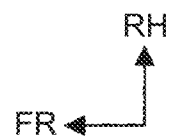
FIG. 4
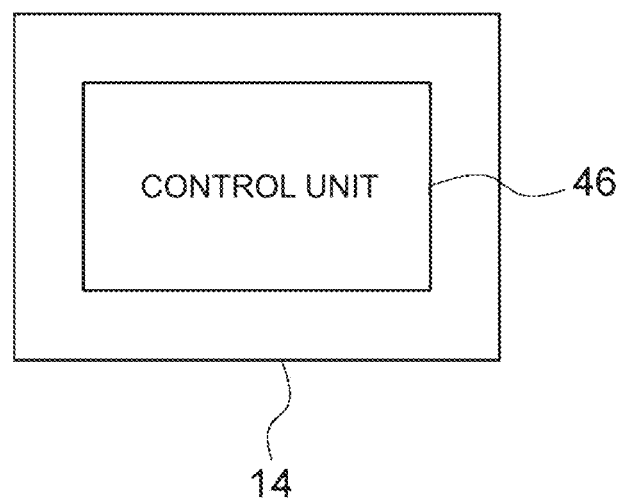

AR GLASSES

CROSS-REFERENCE TO RELATED APPLICATION

This application claims priority to Japanese Patent Application No. 2021-201988 filed on Dec. 13, 2021, incorporated herein by reference in its entirety.

BACKGROUND

1. Technical Field

This disclosure relates to augmented reality (AR) glasses.

2. Description of Related Art

Japanese Unexamined Patent Application Publication No. 2019-184758 (JP 2019-184758 A) describes a display unit that includes a display unit that provides image information by a virtual image so that a landscape in front of a user can be visually recognized, and that displays vehicle information such as a vehicle speed in a fixed display region of the wearer's visual field range.

SUMMARY

Since conventional AR glasses (also referred to as smart glasses) including the head-mounted display described in JP 2019-184758 A superimpose a virtual image on an actual scene, in a situation such as daytime when the sunlight is strong, it was sometimes difficult to see the virtual image due to the virtual image losing to the light (external light) of the actual scene.

The present disclosure has been made in consideration of the above fact, and an object of the present disclosure is to obtain AR glasses capable of suppressing a display virtual image from becoming difficult to see due to the influence of external light.

AR glasses according to a first aspect includes: a display unit that displays a virtual image within a field of view of a wearer such that an actual view right in front of the wearer is able to be seen; a transmittance changing portion that is able to partially change a transmittance of external light; and a control unit that sets a transmittance of external light of a portion of the transmittance changing portion corresponding to the virtual image to be lower than a transmittance of external light of another portion.

In the first aspect, the transmittance changing portion capable of partially changing the transmittance of the external light is provided. The control unit sets the transmittance of the external light of the portion of the transmittance changing portion corresponding to the virtual image displayed by the display unit to be lower than the transmittance of the external light of the other portion. As a result, since the amount of light incident on the wearer's eyes among the external light in the portion corresponding to the virtual image displayed on the display unit is reduced, it is possible to suppress the displayed virtual image from becoming difficult to see due to the influence of the external light.

According to a second aspect, in the first aspect, when the wearer is a passenger other than a driver of a vehicle, the control unit sets at least one of a position, the number, and a kind of the virtual image displayed by the display unit to be different compared to when the wearer is the driver of the vehicle.

In the second aspect, when the wearer of the AR glasses is the passenger other than the driver of the vehicle, at least one of the position, number, and kind of the virtual image displayed by the display unit is set to be different compared to when the wearer is the driver of the vehicle. As a result, the display can be made suitable for the case where the wearer is the driver of the vehicle and the case where the wearer is the passenger other than the driver.

According to a third aspect, in the first or second aspect, the display unit displays a plurality of kinds of the virtual images having different priorities from each other, and the control unit changes the transmittance of the external light of the portion of the transmittance changing portion corresponding to the virtual image per portion corresponding to each of the virtual images in accordance with a priority of each of the virtual images.

In the third aspect, the transmittance of the external light of the portion corresponding to the virtual image is changed for each portion corresponding to each of the virtual images, in accordance with the priority of each of the virtual images Thus, for example, by lowering the transmittance of the external light as the priority of the virtual image increases, it is possible to more reliably suppress that the virtual image having a high priority becomes difficult to see due to the influence of the external light.

According to a fourth aspect, in the first to third aspects, the control unit lowers a transmittance of external light of a portion of the transmittance changing portion where an eye of the wearer is exposed to the sun's rays, regardless of whether the virtual image is displayed.

In the fourth aspect, since the transmittance of the external light in the portion where the eye of the wearer is exposed to the sun's rays is lowered regardless of the presence or absence of the display of the virtual image, an antiglare function can be added to the AR glasses according to the present disclosure.

AR glasses according to a fifth aspect include: a display unit that displays a virtual image within a field of view of a wearer such that an actual view right in front of the wearer is able to be seen; a transmittance changing portion that is able to entirely change a transmittance of external light; and a control unit that sets the transmittance of the external light of the transmittance changing portion when the display unit displays the virtual image to be lower than the transmittance of the external light of the transmittance charging portion when the display unit does not display the virtual image.

In the fifth aspect, the transmittance changing portion capable of entirely changing the transmittance of the external light is provided. The control unit that sets the transmittance of the external light of the transmittance changing portion when the display unit displays the virtual image to be lower than the transmittance of the external light of the transmittance charging portion when the display unit does not display the virtual image. As a result, when the virtual image is displayed by the display unit, since the amount of the external light incident on the wearer's eyes is reduced, it is possible to suppress the displayed virtual image from becoming difficult to see due to the influence of the external light.

The present disclosure has an effect that it is possible to suppress a displayed virtual image from becoming difficult to see due to an influence of external light.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a schematic view showing a liquid crystal panel provided on the AR glasses;

FIG. 4 is a functional block diagram of an AR glasses control unit;

DETAILED DESCRIPTION OF EMBODIMENTS

Figure 1:
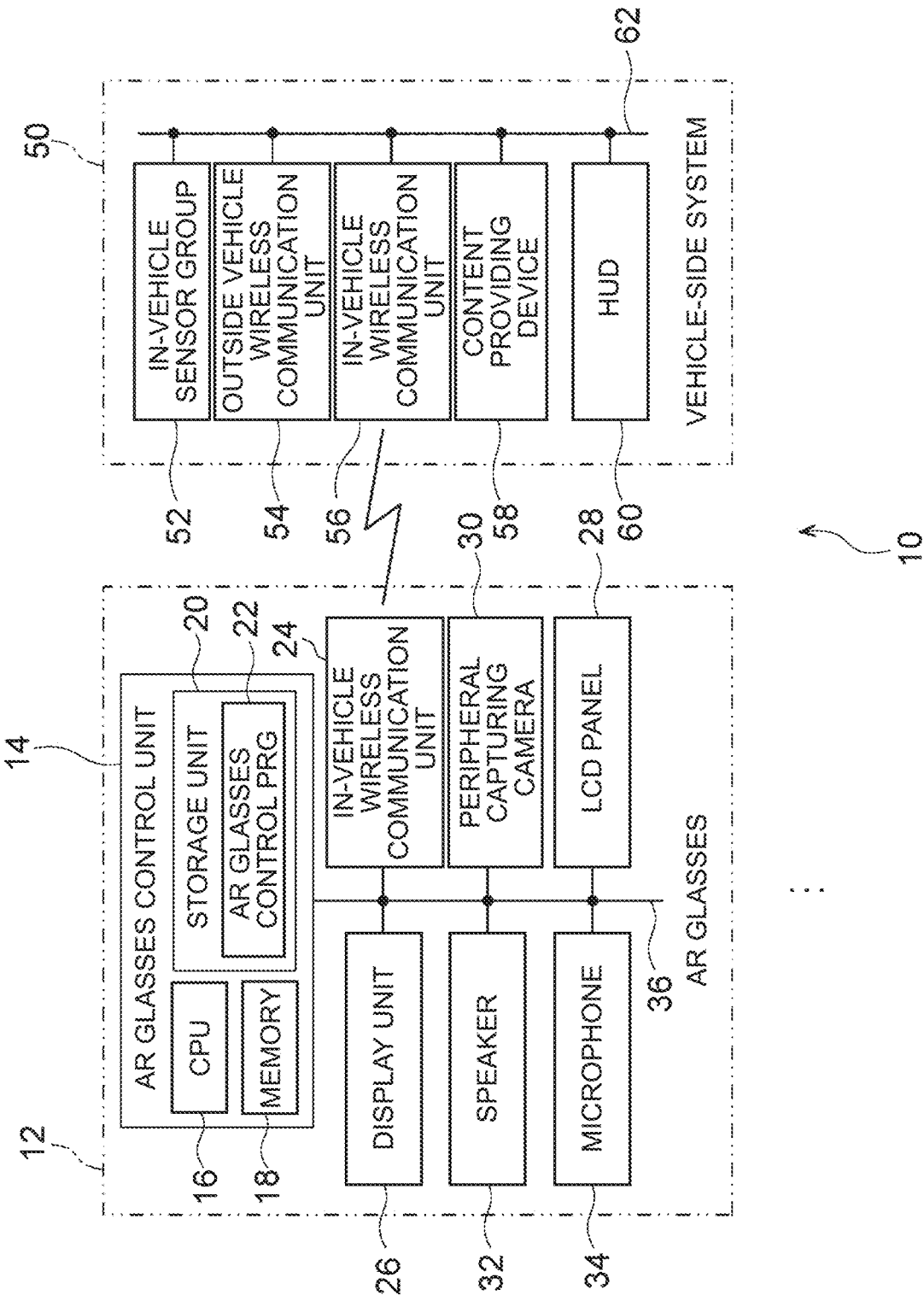
FIG. 1 is a block diagram showing a configuration of a content display system according to an embodiment.

Hereinafter, an example of an embodiment of the present disclosure will be described in detail with reference to the drawings. FIG. 1 shows a content display system 10 according to an embodiment. The content display system 10 includes a vehicle-side system 50 mounted on a vehicle and AR glasses 12 worn by an occupant in the vehicle (own vehicle) on which the vehicle-side system 50 is mounted. The AR glasses 12 are an example of the AR glasses according to the present disclosure.

Although the details will be described later, the vehicle-side system 50 provides the AR glasses 12 with information on the content such as texts and marks to be displayed on the AR glasses 12, and the AR glasses 12 display the content provided by the vehicle-side system 50. In the present embodiment, a plurality of AR glasses 12 is prepared for each vehicle, and is worn by an occupant (hereinafter referred to as a driver) seated in a driver's seat of the own vehicle and is also worn by a passenger (hereinafter referred to as a fellow passenger) seated in a seat other than the driver's seat of the own vehicle.

The AR glasses 12 include an AR glasses control unit 14, an in-vehicle wireless communication unit 24, a display unit 26, a monochrome liquid crystal panel 28, a peripheral capturing camera 30, a speaker 32, and a microphone 34, which are connected to each other via an internal bus 36 so that they can communicate with each other. The in-vehicle wireless communication unit 24 performs short-distance wireless communication with the vehicle-side system 50.

Figure 2:
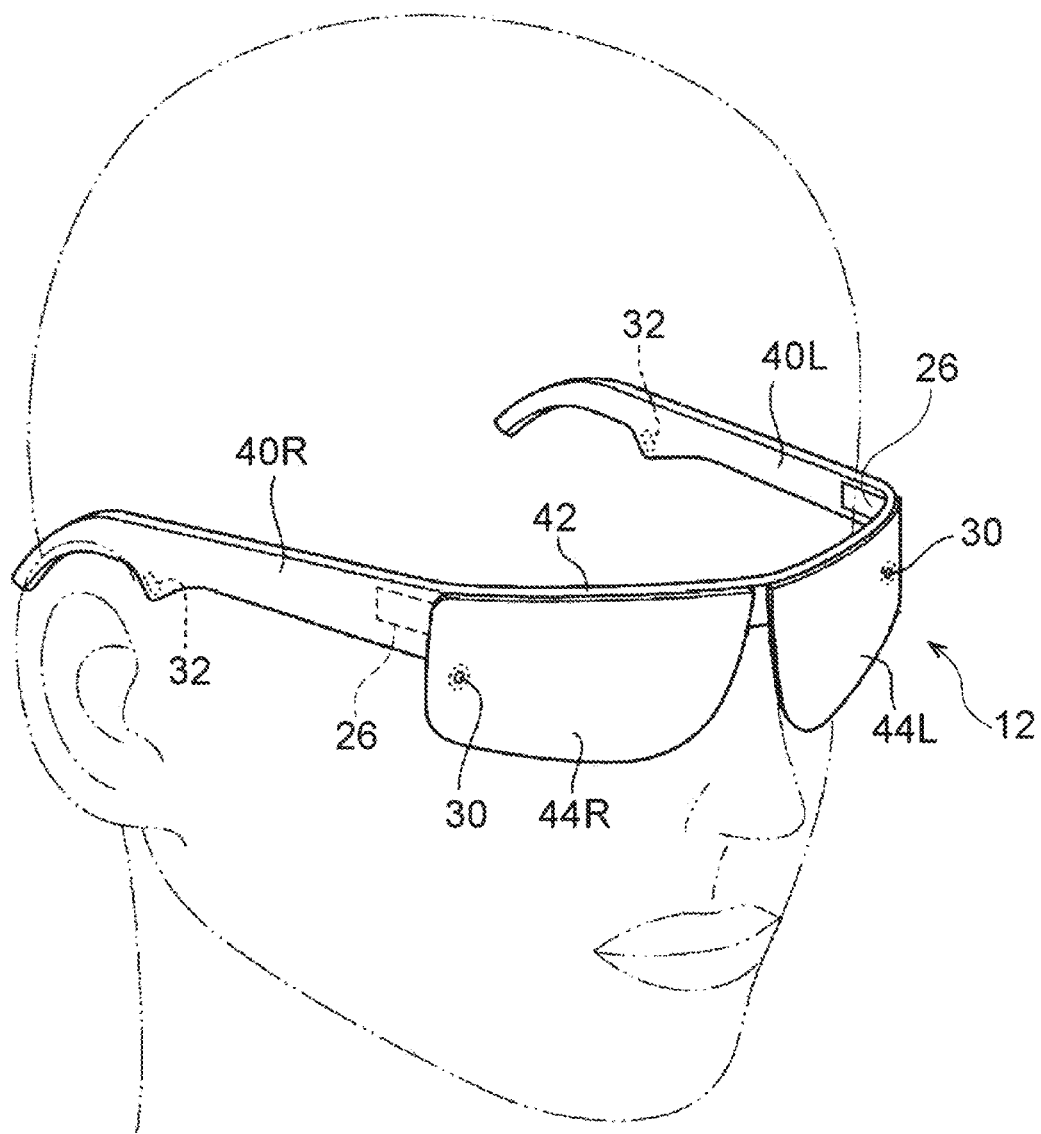
FIG. 2 is a perspective view showing an example of the appearance of AR glasses.

As shown in FIG. 2, in the AR glasses 12, left and right glasses portions 44L and 44R having light transmission are attached to a frame 42 to which base portions of left and right temples 40L and 40R are attached. The display unit 26 is embedded near the base portions of the left and right temples 40L and 40R, for example, and a virtual image is displayed within a visual field range of a wearer of the AR glasses 12 so that an actual view in front is visible.

That is, the display unit 26 can display the content by irradiating a virtual image display light (see FIG. 3) modulated according to the content to be displayed on the AR glasses 12 on inner surfaces of the glasses portions 44L and 44R (surfaces facing eyes of the occupant wearing the AR glasses 12). As a result, an image (virtual image) of the content displayed by the display unit 26 is superimposed within a range of the actual field of view (for example, the real image in front of the vehicle) through the glasses portions 44L and 44R and is visually recognized by the occupant wearing the AR glasses 12.

The actual field of view through the AR glasses 12 extends over a range including an A pillar and a side window of the own vehicle, in a width direction of the own vehicle. The display unit 26 can display an image (virtual image) of the content at a position corresponding to the A pillar and the side window of the own vehicle.

As shown in FIG. 3, the liquid crystal panel 28 is attached to an outer surface of the glasses portions 44L and 44R. The liquid crystal panel 28 is able to partially change a transmittance of light (external light) that is transmitted from the outer surfaces of the glasses portions 44L and 44R through the liquid crystal panel 28 and the glasses portions 44L and 44R and that incidents the eyes of the occupant wearing the AR glasses 12. The liquid crystal panel 28 is an example of a transmittance changing portion in the present disclosure.

The AR glasses control unit 14 includes a central processing unit (CPU) 16, a memory 18 such as a read only memory (ROM) and a random access memory (RAM), a non-volatile storage unit 20 such as a hard disk drive (HDD) or a solid state drive (SSD). An AR glasses control program 22 is stored in the storage unit 20 in advance. In the AR glasses control unit 14, the AR glasses control program 22 is read from the storage unit 20 and expanded into the memory 18, and the CPU 16 executes the AR glasses control program 22 expanded in the memory 18, thereby functioning as a control unit 46 shown in FIG. 4. By performing the AR glasses display control process described later, the control unit 46 decreases the transmittance of the external light of a portion of the liquid crystal panel 28 corresponding to a portion in which the virtual image is displayed by the display unit 26 to be lower than the transmittance of the external light of the other portion.

A pair of the peripheral capturing cameras 30 for capturing the front of the AR glasses 12 is attached to the outer surfaces of the glasses portions 44L and 44R at positions that do not block the view of the occupant wearing the AR glasses 12. Further, among the temples 40L and 40R, a pair of the speakers 32 is provided at positions corresponding to the occupant's ears in a state in which the AR glasses 12 are worn by the occupant. The AR glasses control unit 14 outputs sound from the speaker 32 as needed.

The AR glasses control unit 14 is built in, for example, the frame 42 together with the microphone 34. For example, the temples 40L and 40R have a built-in battery (not shown) and a power supply jack (not shown). The arrangement positions of the AR glasses control unit 14, the microphone 34, the battery, and the power supply jack are not limited to the above.

The vehicle-side system 50 includes an in-vehicle sensor group 52, an outside vehicle wireless communication unit 54, an in-vehicle wireless communication unit 56, a content providing device 58, and a head up display (HUD) 60, and these are connected to each other via the system bus 62 so that they can communicate with each other.

The in-vehicle sensor group 52 includes a vehicle speed sensor that detects a vehicle speed of the vehicle, an acceleration sensor that detects an acceleration of the vehicle, and a global navigation satellite system (GNSS) sensor that detects a current position of the vehicle. Further, the in-vehicle sensor group 52 includes a peripheral monitoring sensor that detects and monitors an object such as a pedestrian or another vehicle existing around the vehicle by a radar or the like, a camera that photographs the surroundings of the own vehicle, and the like.

The outside vehicle wireless communication unit 54 performs wireless communication with other vehicles existing around the own vehicle, a server (not shown), and the like. In addition, the in-vehicle wireless communication unit 56 performs short-distance wireless communication with the in-vehicle wireless communication unit 56 of the AR glasses 12.

The content providing device 58 generates content to be displayed as a virtual image on the AR glasses 12 based on the information collected from the in-vehicle sensor group 52 and the like. In addition, the content providing device 58 sets the purpose (whether it is for the driver, for the fellow passenger, or for sharing) for the generated content. The content for the driver is the content to be displayed only on the AR glasses 12 worn by the driver. The content for the fellow passenger is the content to be displayed only on the AR glasses 12 worn by the fellow passenger. The content to be shared is content to be displayed on the AR glasses 12 worn by the driver and the AR glasses 12 worn by the fellow passenger.

Further, the content providing device 58 sets display priorities for each of the content (the content for the driver and the content to be shared) to be displayed on the AR glasses 12 worn by the driver. Then, when the content is requested from the AR glasses 12 worn by the driver, the content providing device 58 provides the content for the driver and the content to be shared to the AR glasses 12 that is the requesting source. Further, when the content is requested from the AR glasses 12 worn by the fellow passenger, the content providing device 58 provides the content for the fellow passenger and the content to be shared to the AR glasses 12 that is the requesting source.

To give an example of the content generated by the content providing device 58, the content providing device 58 acquires the vehicle speed from the vehicle speed sensor included in the in-vehicle sensor group 52, and generates the vehicle speed content that displays the acquired vehicle speed as the content for the driver. Further, since the vehicle speed is highly important information for the driver, the content providing device 58 sets a relatively high priority as the display priority for the vehicle speed display content.

Further, for example, the content providing device 58 acquires the current position and orientation of the own vehicle from the GNSS sensor included in the in-vehicle sensor group 52, and collates the acquired current position and orientation with map information to identify information on buildings present in front of the own vehicle. Then, the content providing device 58 generates the building information display content that displays the information of the identified building as, for example, content to be shared. Since the information on the building present in front of the own vehicle is less important to the driver than the vehicle speed, the content providing device 58 sets lower priority of the vehicle speed display content than the building information display content as the display priority.

Further, for example, the content providing device 58 acquires information on another vehicle existing around the own vehicle from the peripheral monitoring sensor included in the in-vehicle sensor group 52, and performs pattern matching for an image of the other vehicle acquired from the camera included in the in-vehicle sensor group 52 so as to identify a vehicle name of the other vehicle existing around the own vehicle. Then, the content providing device 58 generates the other vehicle information display content that displays the vehicle name of the identified other vehicle as content to be shared, for example. Since the information on the other vehicle present around the own vehicle is less important to the driver than the vehicle speed, the content providing device 58 sets lower priority of the vehicle speed display content than the other vehicle information display content as the display priority.

The above-mentioned content is merely an example of the content generated by the content providing device 58. For example, when a distance between the own vehicle and the pedestrian or the other vehicle detected by the peripheral monitoring sensor included in the in-vehicle sensor group 52 is equal to or less than a predetermined value, the content providing device 58 may generate content such as "watch out for pedestrians!" as content for the driver, for example.

Further, for example, when the own vehicle is approaching a point for turning at an intersection in a route to a destination on which the own vehicle is traveling, the content providing device 58 may generate content such as "right turn ahead!" as content for the driver, for example. Further, for example, when the own vehicle is to arrive at the destination soon, the content providing device 58 may generate content such as "arriving at destination soon!" as content for the driver, for example.

Further, the content providing device 58 cooperates with, for example, a car navigation device, and when the destination is set for the car navigation device, the content providing device 58 may receive weather information from a server not shown, and may generate content such as "It is sunny in Nagoya!" as content to be shared.

Further, the content providing device 58 may generate (play) video content such as a movie as the content for the fellow passenger, for example, in response to a request from the fellow passenger.

Figure 5:
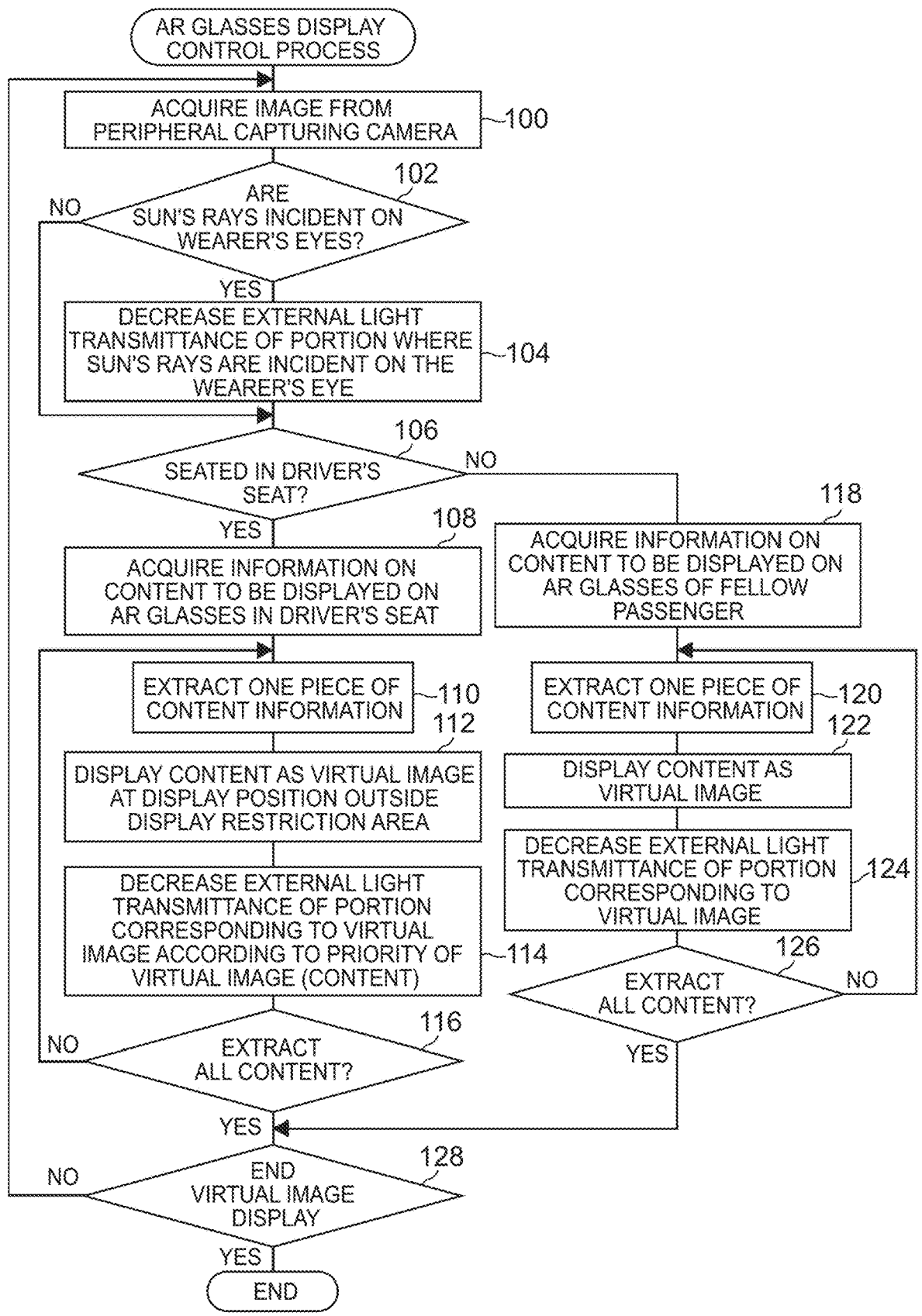
FIG. 5 is a flowchart showing an AR glasses display control process executed by the AR glasses control unit.

Next, as the operation of the present embodiment, the AR glasses display control process performed on the AR glasses 12 while the power of the AR glasses 12 are turned on will be described with reference to FIG. 5.

In step 100 of the AR glasses display control process, the control unit 46 acquires, from the peripheral capturing camera 30, an image (peripheral capturing image) in front of the AR glasses 12 captured by the peripheral capturing camera 30. In step 102, based on whether there is a high-luminance region having a brightness equal to or higher than a threshold value in the peripheral captured image acquired in step 100, the control unit 46 determines whether the sun's rays (external light equal to or greater than a predetermined amount of light) is incident on the eye of the wearer wearing the AR glasses 12 through the AR glasses 12.

When a high-brightness region exists in the peripheral captured image, the determination in step 102 is affirmed and the process proceeds to step 104. In step 104, the control unit 46 reduces the transmittance of external light in the portion of the liquid crystal panel 28 corresponding to the high-brightness region in the peripheral captured image, that is, the portion in which external light equal to or greater than a predetermined amount is incident (see also the portion indicated by a reference numeral "70" in FIG. 6). As a result, the amount of external light incident on the wearer's eye through the AR glasses 12 is reduced and the glare felt by the wearer is reduced. When the determination in step 102 is affirmative, the process proceeds to step 104.

In the next step 106, the control unit 46 determines whether the wearer of the AR glasses 12 is a driver seated in the driver's seat. The determination in step 106 can be performed, for example, by determining whether an image region corresponding to a steering wheel, a meter, or the like exists at a predetermined position in the peripheral captured image acquired in step 100. When the determination in step 106 is affirmative, the process proceeds to step 108.

In step 108, with respect to the content providing device 58 of the vehicle-side system 50, the control unit 46 requests the content for the driver and the content to be shared to be displayed on the AR glasses 12 of the driver and acquires the information of the content from the content providing device 58.

In step 110, the control unit 46 extracts one piece of content information from the content information acquired in step 108. In step 112, the control unit 46 processes the content for which information has been extracted in step 110 as necessary according to the priority of the content, and then causes the display unit 26 to display the content at a display position outside a display restriction area 74 (see FIG. 7) that is preset.

Figure 7:
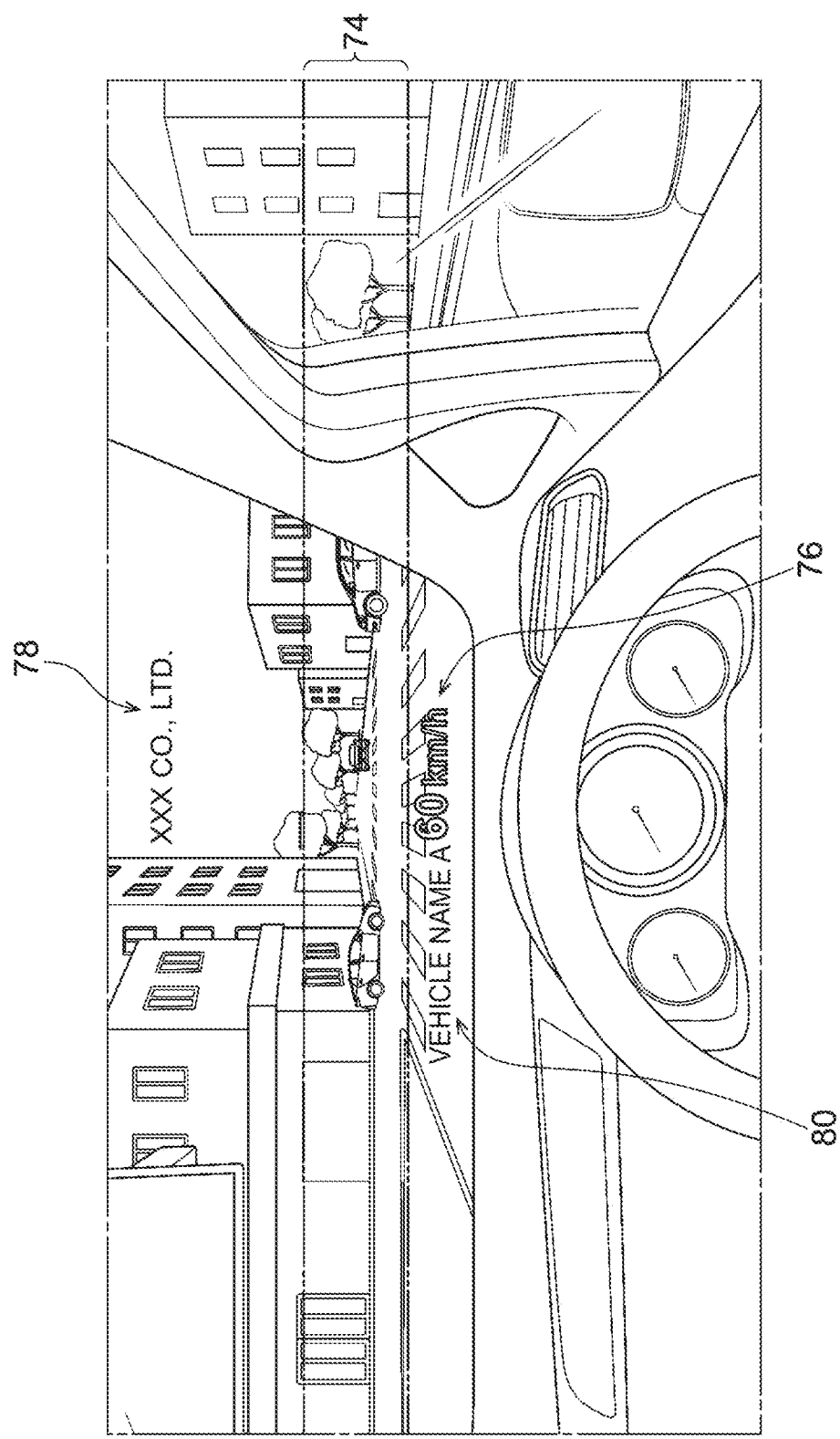
FIG. 7 is an image diagram showing an example of a state in which content is displayed on the AR glasses of a driver.

As shown in FIG. 7, the display restriction area 74 is set to be an area in which an object (for example, a road, another vehicle, a pedestrian, etc.) that the driver frequently sees during driving is present, within the range of the driver's actual field of view. Thus, by setting the display position of the content outside the display restriction area 74, vehicle speed display content 76, building information display content 78, and other vehicle information display content 80 shown in FIG. 7 as an example can be suppressed from being a hinderance of driving by the driver.

The display restriction area 74 may differ from country to country, for example. In this case, the control unit 46 may acquire country information representing the country in which the own vehicle is currently located from the vehicle-side system 50, and may perform a process of applying the display restriction area 74 corresponding to the country represented by the acquired country information.

Further, in the present embodiment, the priority of the other vehicle information display content 80 shown in FIG. 7 is set lower than the priority of the vehicle speed display content 76. Thus, in the present embodiment, the other vehicle information display content 80 to be displayed on the AR glasses 12 of the driver is processed in accordance with the priority (simplify the display more than the other vehicle information display content 84 to be displayed on the AR glasses 12 of the fellow passenger (see FIG. 8)) and is displayed. In FIG. 7, the display of the other vehicle information display content 80 is simplified by reducing the font size of the text and omitting the balloon that decorates the text. As a result, it is possible to suppress the other vehicle information display content 80 from interfering with the driving by the driver.

Figure 6:
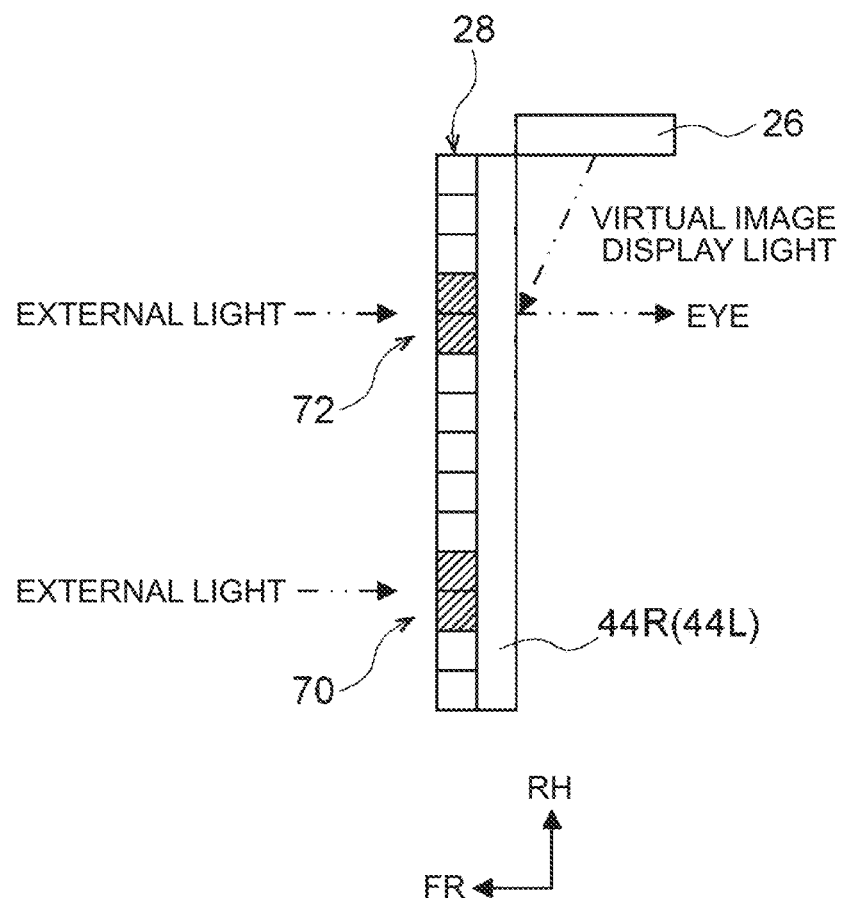
FIG. 6 is a schematic view showing a state in which a transmittance of external light is controlled with respect to the liquid crystal panel of AR glasses.

In step 114, the control unit 46 decreases the transmittance of the external light of the portion of the liquid crystal panel 28 of the AR glasses 12 corresponding to the content displayed as the virtual image in step 112 in accordance with the priority of the content displayed as the virtual image (see also the portion indicated by reference numeral "72" in FIG. 6). Specifically, the control unit 46 lowers the transmittance of the external light in the corresponding portion of the liquid crystal panel 28 as the priority of the content increases.

For example, in FIG. 7, the transmittance of the external light of the portion of the liquid crystal panel 28 corresponding to the vehicle speed display content 76 is set to be lower than the transmittance of the external light of the portion corresponding to the building information display content 78 and the other vehicle information display content 80. As a result, it is possible to suppress the virtual image (content) from becoming difficult to see due to losing to the external light in a situation such as daytime when the sunlight is strong. In addition, it is possible to more reliably suppress the virtual image (content) having a high priority from becoming difficult to see due to the influence of external light.

In step 116, the control unit 46 determines whether all the content information has been extracted from the content information acquired in step 108. When the determination in step 116 is negative, the process returns to step 110, and steps 110 to 116 are repeated until the determination in step 116 becomes affirmative. As a result, as shown in FIG. 7, the AR glasses 12 of the driver is in a display state in which the vehicle speed display content 76, the building information display content 78, the other vehicle information display content 80, and the like are displayed as the virtual images. When the determination in step 116 is affirmative, the process proceeds to step 128.

On the other hand, in step 106, when the wearer of the AR glasses 12 is the fellow passenger, the determination in step 106 is denied and the process proceeds to step 118. In step 118, with respect to the content providing device 58 of the vehicle-side system 50, the control unit 46 requests the content for the fellow passenger and the content to be shared to be displayed on the AR glasses 12 of the fellow passenger and acquires the information of the content from the content providing device 58.

In step 120, the control unit 46 extracts one piece of content information from the content information acquired in step 118. In step 122, the control unit 46 causes the display unit 26 to display the content from which the information has been extracted in step 110 on the AR glasses 12 as the virtual image. In the AR glasses 12 for the fellow passenger, since the wearer (fellow passenger) does not drive the vehicle, the display restriction area 74 is not set in the present embodiment, and the display position of the content is set independently of the display restriction area 74 and the display of the content is not simplified.

In step 124, the control unit 46 decreases the transmittance of the external light of the portion of the liquid crystal panel 28 of the AR glasses 12 corresponding to the content displayed as the virtual image in step 122. As a result, it is possible to suppress the virtual image (content) from becoming difficult to see due to losing to the external light in a situation such as daytime when the sunlight is strong. In the present embodiment, in the AR glasses 12 for the fellow passenger, the transmittance of the external light in the portion corresponding to the content displayed as the virtual image is uniformly reduced.

Figure 8:
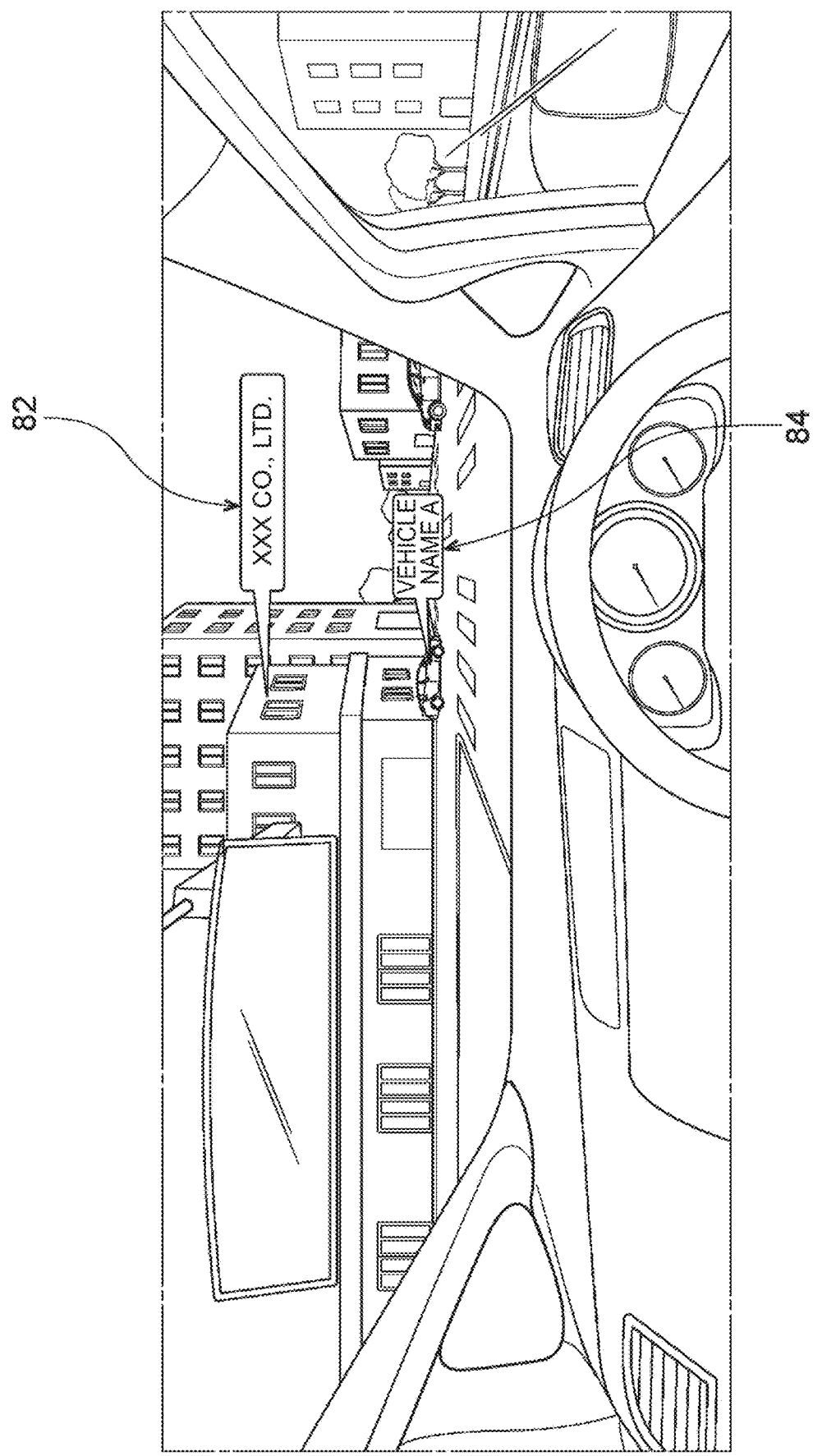
FIG. 8 is an image diagram showing an example of a state in which content is displayed on the AR glasses of a fellow passenger.

In step 126, the control unit 46 determines whether all the content information has been extracted from the content information acquired in step 118. When the determination in step 126 is negative, the process returns to step 120, and steps 120 to 126 are repeated until the determination in step 126 becomes affirmative. As a result, the AR glasses 12 of the fellow passenger is in a state in which building information display content 82, other vehicle information display content 84, and the like are displayed as the virtual images, as shown in FIG. 8 as an example. As is clear from comparing FIG. 8 with FIG. 7, in the present embodiment, the position, the number, and the type of the virtual image (content) to be displayed are set by the AR glasses 12 of the driver and the AR glasses 12 of the fellow passenger are made to be different. When the determination in step 126 is affirmative, the process proceeds to step 128.

In step 128, the control unit 46 determines whether to end the process of displaying the content as the virtual image on the AR glasses 12 due to the power of the AR glasses 12 being turned off or the like. When the determination in step 128 is denied, the process returns to step 100, and the processes after step 100 are repeated. When the determination in step 128 is affirmed, the AR glasses display control process is terminated.

As described above, the AR glasses 12 according to the present embodiment include the display unit 26 that displays the virtual image within the visual field of the wearer so that the actual view in front of the eyes can be visually recognized, and the liquid crystal panel 28 that can partially change the transmittance of the external light. Then, the control unit 46 lowers the transmittance of the external light of the portion of the liquid crystal panel 28 corresponding to the virtual image to be lower than the transmittance of the external light of the other portion. As a result, since the amount of light incident on the wearer's eyes among the external light in the portion corresponding to the virtual image displayed on the display unit 26 is reduced, it is possible to suppress the displayed virtual image from becoming difficult to see due to the influence of the external light.

Further, in the present embodiment, when the wearer of the AR glasses 12 is the fellow passenger, the control unit 46 makes the position, the number, and the type of the virtual image to be displayed by the display unit 26 different from when the wearer of the AR glasses 12 is the driver. As a result, the display can be made suitable for the case where the wearer of the AR glasses 12 is the driver and the case where the wearer is the fellow passenger.

Further, in the present embodiment, the display unit 26 displays a plurality of types of virtual images having different priorities from each other, and the control unit 46 changes the transmittance of the external light of the portion of the liquid crystal panel 28 corresponding to the virtual image for each portion corresponding to each of the virtual images, in accordance with the priority of each of the virtual images. This makes it possible to more reliably suppress the virtual image having a high priority from becoming difficult to see due to the influence of the external light.

Further, in the present embodiment, the control unit 46 lowers the transmittance of the external light of the portion of the liquid crystal panel 28 where the eye of the wearer is exposed to the sun's rays, regardless of whether the virtual image is displayed. As a result, it is possible to reduce the glare felt by the wearer of the AR glasses 12.

In the above embodiment, described is a aspect in which when the wearer of the AR glasses 12 is the fellow passenger, each of the position, the number, and the type of the virtual image (content) displayed by the display unit 26 is made to be different as compared with the case where the wearer of the AR glasses 12 is the driver. However, the present disclosure is not limited to this, and when the wearer of the AR glasses 12 is the fellow passenger, parameters that are made to be different to the case in which the wearer of the AR glasses 12 is the driver may be at least one of the position, the number, and the type of the virtual image (content).

Further, in the above embodiment, the erasing of the content once displayed on the AR glasses 12 is not particularly described. However, for example, the AR glasses 12 are provided with a line-of-sight camera that photographs the eyes of the passenger wearing the AR glasses 12 to detect the line of sight of the passenger, and may erase the display of the content (especially the content with a low priority) that the passenger visually recognized for a predetermined time or more, for example.

Further, in the above embodiment, the aspect in which the content providing device 58 sets the priority of the content to be displayed on the AR glasses 12 of the driver has been described. However, the present disclosure is not limited to this, and the priority of the content may be set on the AR glasses 12 side.

Further, in the above embodiment, described is the aspect in which the priority is not set for the content displayed as the virtual image for the AR glasses 12 of the fellow passenger, and the transmittances of the external light of the portion of the liquid crystal panel 28 corresponding to the content displayed as the virtual image are all uniformly lowered. However, the present disclosure is not limited to this, and also for the AR glasses 12 of the fellow passenger, the priority is set for the content to be displayed as the virtual image, and the transmittance of the external light of the portion of the liquid crystal panel 28 corresponding to each content may be lowered according to the priority of the content.

Further, in the above embodiment, as an example of the transmittance changing portion, an embodiment in which the liquid crystal panel 28 capable of partially changing the transmittance of the external light is used has been described. However, the present disclosure is not limited to this. Instead, the configuration may be such that the transmittance changing portion has a configuration in which the transmittance of the external light can be entirely changed. As a result, the transmittance changing portion can be configured at a lower cost as compared with the case where the transmittance changing portion is configured so that the transmittance of the external light can be partially changed. Then, by having a configuration in which the transmittance of the external light of the transmittance changing portion when the display unit 26 displays the virtual image of the control unit 46 is set to be lower than the transmittance of the external light when the display unit 26 does not display the virtual image, it is possible to suppress the displayed virtual image from becoming difficult to see due to the influence of the external light.

Further, in the above embodiment, the mode in which the AR glasses control program 22 is stored (installed) in the storage unit 20 in advance has been described. However, the AR glasses control program 22 can be provided in a form in which the AR glasses control program is stored in a non-temporary recording medium such as an HDD, SSD, or DVD.

What is claimed is:

1. AR glasses, comprising:
   a display unit configured to display a virtual image within a field of view of a wearer such that an actual view right in front of the wearer is able to be seen;
   a peripheral capturing camera configured to capture the actual view in the front of the wearer;
   a transmittance changing portion configured to partially change a transmittance of external light; and
   a control unit configured to set the transmittance of external light at a portion of the transmittance changing portion corresponding to the virtual image to be lower than the transmittance of external light at another portion of the transmittance changing portion, wherein the control unit is configured to
      determine whether the wearer of the AR glasses is a driver seated in a predetermined seat of a vehicle by determining whether a predetermined image region exists at a predetermined position in an image captured by the peripheral capturing camera, and
      in response to determining that the wearer is a passenger other than the driver, set at least one of a position, a number, or a kind of the virtual image displayed by the display unit to be different compared to a case in which the wearer is the driver.

2. The AR glasses according to claim 1,
wherein the display unit is configured to display virtual images including the virtual image, different kinds of the virtual images having different priorities from each other, and
wherein the control unit is configured to change the transmittance of external light at a corresponding portion of the transmittance changing portion corresponding to each virtual image of the virtual images in accordance with a priority of said virtual image.

3. The AR glasses according to claim 1,
wherein the control unit is configured to lower the transmittance of external light at a portion of the transmittance changing portion where an eye of the wearer is exposed to the sun's rays, regardless of whether the virtual image is displayed.

4. AR glasses, comprising:
a display unit configured to display a virtual image within a field of view of a wearer such that an actual view right in front of the wearer is able to be seen;
a peripheral capturing camera configured to capture the actual view in the front of the wearer;
a transmittance changing portion configured to entirely change a transmittance of external light; and
a control unit configured to set the transmittance of external light at the transmittance changing portion when the display unit displays the virtual image to be lower than the transmittance of external light at the transmittance charging portion when the display unit does not display the virtual image, wherein the control unit is configured to
determine whether the wearer of the AR glasses is a driver seated in a predetermined seat of a vehicle by determining whether a predetermined image region exists at a predetermined position in an image captured by the peripheral capturing camera, and
in response to determining that the wearer is a passenger other than the driver, set at least one of a position, a number, or a kind of the virtual image displayed by the display unit to be different compared to a case in which the wearer is the driver.

5. The AR glasses according to claim 1,
wherein the predetermined image region includes a steering wheel of the vehicle or a meter of the vehicle.

6. The AR glasses according to claim 4,
wherein the predetermined image region includes a steering wheel of the vehicle or a meter of the vehicle.

7. AR glasses, comprising:
a display unit configured to display virtual images within a field of view of a wearer such that an actual view right in front of the wearer is able to be seen, wherein the virtual images include contents having different priorities from each other;
a transmittance changing portion configured to partially change a transmittance of external light; and
a control unit configured to
set the transmittance of external light at corresponding portions of the transmittance changing portion corresponding to the virtual images to be lower than the transmittance of external light at another portion of the transmittance changing portion where the virtual images are not displayed, and
change the transmittance of external light at the corresponding portion of the transmittance changing portion corresponding to each virtual image of the virtual images in accordance with a priority of a content of said virtual image, by lowering the transmittance of external light at the corresponding portion of the transmittance changing portion as the priority of the content of said virtual image increases.

8. The AR glasses according to claim 7, further comprising:
a line-of-sight camera configured to photograph eyes of the wearer to detect a line of sight of the wearer,
the control unit is configured to
in response to determining, through the line-of-sight camera, that the wearer visually recognized a virtual image including a content having a priority lower than a predetermined degree for a predetermined time or more, erase the virtual image including the content having the priority lower than the predetermined degree.

9. The AR glasses according to claim 7,
wherein the control unit is configured to lower the transmittance of external light at a portion of the transmittance changing portion where an eye of the wearer is exposed to the sun's rays, regardless of whether the virtual images are displayed.

* * * * *